United States Patent Office 3,141,951
Patented July 21, 1964

3,141,951
METHOD OF SPOT WELDING LIGHT METAL
Seiichi Tsukada, Kimio Kimura, and Makoto Osumi, Nagoya, and Hiromitsu Yamamoto, Prefecture of Aichi, Japan, assignors to Shin-Mitsubishi Jukogyo Kabushiki Kaisha, Tokyo, Japan, a corporation of Japan
No Drawing. Filed Jan. 23, 1962, Ser. No. 168,267
Claims priority, application Japan Jan. 30, 1961
3 Claims. (Cl. 219—91)

This invention relates to a spot welding method of light metal and more particularly to a spot welding method of light metal or light metal alloy, in which an external force is applied to the oxidation films at the spot welding part of the abutting surfaces of the overlapped materials to be welded, thereby forming very fine cracks uniformly in the oxidation films in the spot welding part, and then an electric current is applied therethrough.

This invention further relates to a spot welding method of light metal or light metal alloy, in which the overlapped materials to be welded are impactingly pinched by the electrodes, thereby forming very fine cracks uniformly in the oxidation films of the abutting surfaces of the materials at the spot welding part, and then electric current is applied threthrough by the electrodes.

This invention furthermore relates to a spot welding method of light metal or light metal alloy, in which the overlapped materials to be welded are pinched under pressure by the electrodes, an external force causing the materials to slip relatively to each other is added, thereby forming very fine cracks uniformly in the oxidation films of the abutting surfaces of the materials at the spot welding part, and then an electric current is applied therethrough by the electrodes.

In the conventional spot welding method of light metal or light metal alloy, such as aluminum, magnesium and the like, if preparatory treatment is omitted, a strong oxidation film which usually covers the surface of plate will cause irregular nuggets, much dust and unequal strength, which results in a lack of reliability. Therefore, conventionally the pickling process has been carried out in order to remove such oxidation film prior to the spot welding; however, this process has been found to restrict the welding operation to some extent, because of its severe operation control conditions and limitation in the weldable time after the process has been applied.

Therefore, the object of this invention is to obtain a spot weld of high quality with regular nuggets, by means of an extremely simple mechanical spot welding operation which eliminates the preliminary pickling treatment. This invention is based on a discovery that the superficial oxidation film can be fully removed by the creation of very fine cracks all over the surface to be welded by applying an external force. This invention is characterized in that, by means of an external force, such as impinging a load on the oxidation film on the part to be welded or slipping out each abutting surface of the plates to be welded respectively, the oxidation film on the abutting surface to be spot welded is formed with very fine cracks on the whole surface; and in turn, by applying an electric current therethrough by a conventional method, a spot weld is performed. Though the oxidation film shows little change merely by the pressurization by the electrode on the welded part as in the prior art, under the present invention, as an oxidation film on the abutting surface is provided with very fine cracks by applying an impinged load on the part to be welded by the electrodes, the welding current flow is distributed uniformly all over the surface.

In consequence, the present invention proves very effective in practical use, without a prior pickling process, providing a spot weld of high quality with regular nuggets in square form and reducing the undesirable unequality in the strength. This process is carried out by adopting such means as an impinged load, based on an idea quite different from the prior art in which the welded articles were pinched, pressurized and spot welded under electrification. In the present invention, it is a sole necessary thing to create very fine and uniform cracks on the oxidation film on the abutting surface to be welded.

As an example, the following method may be adopted, though it is not restricted thereto; when spot welding, the materials to be welded are impactingly pinched by the electrodes, e.g. by impactingly dropping one of the electrodes onto the materials. The electrodes, dropped in this manner, induce very slight horizontal swaying movements which cause a relatively sliding action between the materials; such impact load and sliding movement between both the materials produce in effect very fine cracks all over the oxidation film in the part of each of the materials pressurized by the electrodes.

Another example is that, when spot welding, after the materials to be welded are pinched by the electrode, such external forces, as lightly slip the materials relatively to each other in a straight line or rotatingly, will blend with one of the materials or both of them by the electrode tip or other means. Thus, the abutting surface part pressurized by the electrode will be rubbed by each other forming in the whole surface of the oxidation film very fine cracks.

Of the abovementioned two examples, in the former method, the main purpose is to pinch impactingly the materials to be welded by the electrode and a relative movement to abut the surface of the materials without any swing occurring subordinately in the tip, so that scratches or cracks are produced in the oxidation film. In the latter case, on the other hand, due to the external forces imposed under static pressure by the electrode, the materials to be welded will slightly slip out from each other and each surface is rubbed by the other so that scratches or cracks are produced thereon.

In operating this invention, during the formation of very fine cracks in the oxidation film of the abutting surface of the plates to be welded, it is necessary to avoid the formation of a metal juncture which might contact a local part of the metal surface of both plates and adhere thereto integrally. Should such metal juncture be formed, a welding current, if transmitted, will be conducted only to such a metal juncture part and the heating effect on the other cracked oxidation film part will be little, and there is a fear that welding damaged or a weld with very irregular nuggets will result.

*Example 1*

In spot welding two sheets of non-pickled plates of aluminum alloys of a thickness of 1.0 mm. (2024 $T_3$, clad material) overlapping each other, when spot welded by the conventional method, without preliminary pickling, i.e., pinching calmly with electrode and electrifying under a pressure of approx. 1,000 kg./spot, is compared with the weld impactingly pinched and performed under the same pressure as that above, nuggets were distorted in form and much dust is produced in the former. However, in the latter, by the present invention, very good results were obtained, almost similar to those obtained by the conventional spot welding after pickling treatment. In case of impacting pinching, the momentary pressure reaches more than 3,000 kg./spot, but, in the case of statically pinching, even if a pressure up to about 3,500 kg./spot is added, no such cracks on the oxidation film are produced in the case of impactingly pinching, and accordingly, no good spot weld is obtained.

A number of test results of tensile shear (by Japanese

Industrial Standard) relating to spot welds are summarized as follows:

| | Spot weld by conventional method without pickling, Rupture load | Spot weld by impactingly pinched without pickling, Rupture load | Spot weld by conventional method with pickling, Rupture load |
|---|---|---|---|
| Minimum value, kg./spot | 150 | 250 | 240 |
| Mean value, kg./spot | 279 | 285 | 283 |
| Number of test pieces within ±12.5% of mean value, (percent) | 75 | 95 | 95 |
| Number of test pieces within ±25% of mean value, (percent) | 90 | 100 | 100 |

*Example II*

In the spot welding of two sheets of aluminum material of 1.8 mm. in thickness (similar to those in Exhibit I) overlapping each other, after pinching the metals to be welded by an electrode as usual (pressurized by 1,640 kg./spot), and striking the lower part of the electrode holder in forward and backward directions with a wooden hammer, the top edge of the electrode tip was swung about 0.5 mm. As a result, abutting planes of welded plate were slipped by about $\frac{1}{10}$ mm. and fine cracks were produced all over the oxidation film. Then, spot welding was performed under usual welding conditions and good results obtained, not inferior to those obtained after preliminary treatment by pickling, was obtained.

We claim:

1. A method of spot welding a light metal having a strong oxide film thereon, consisting essentially of the steps of abutting the surfaces of the two parts to be spot welded, applying force to the two parts sufficient only for cracking the oxide film substantially uniformly to form a plurality of fine cracks in the oxide film in the area to be welded without removing the oxide film, and then passing a welding current through the two parts and the cracked oxide film.

2. A method as claimed in claim 1 in which the step of applying a force for the cracking of the oxide film is carried out by impactingly pinching the areas of the parts to be welded between welding electrodes.

3. A method as claimed in claim 1 in which the step of applying a force for the cracking of the oxide film is carried out by applying a pinching force to the area to be welded to pinch the parts to be welded together, and then exerting a force on at least one of the parts to be welded laterally of the pinching force to cause the parts to slip relative to each other.

References Cited in the file of this patent

UNITED STATES PATENTS

| 1,273,203 | Thomson | July 23, 1918 |
| 1,720,570 | Pratt | July 9, 1929 |